United States Patent Office 3,431,210
Patented Mar. 4, 1969

3,431,210
DETERGENT PROCESSES
Chung Yu Shen, St. Louis, Mo., assignor to Monsanto Company, St. Louis, Mo., a corporation of Delaware
No Drawing. Filed Mar. 1, 1966, Ser. No. 530,797
U.S. Cl. 252—135                                    7 Claims
Int. Cl. C11d 3/06, 3/20

ABSTRACT OF THE DISCLOSURE

Particulate alkali metal tripolyphosphate of improved density is prepared by reacting trimetaphosphate with a strong base in the presence of a foaming agent and in the presence of a water soluble volatile oxygen containing organic compound having a boiling point below the temperature of the reaction medium. The alkali metal tripolyphosphates produced are useful as ingredients of detergent formulation.

---

This invention relates to processes for producing detergent compositions. More particularly, it relates to processes for producing detergent compositions containing alkali metal tripolyphosphates which are produced from alkali metal trimetaphosphates.

Belgian patent application No. 633,146 issued Dec. 2, 1963 discloses processes for producing detergents containing alkali metal tripolyphosphate and for producing products which are essentially alkali metal tripolyphosphate but contain a small amount of foaming agent. These processes involve reacting an alkali metal trimetaphosphate with a strong base in the presence of a foaming agent in an aqueous medium and thereafter removing the water to form a solid material. By conducting the reaction in the presence of proper amounts and kinds of surface active agents, a built detergent composition is produced. However if it is desired to produce a product which is essentially alkali metal tripolyphosphate for subsequent use in a detergent formulation, only a small amount of foaming agent is added.

As is disclosed in Belgian Patent No. 633,146, these processes and products have several advantages over the prior processes. However, the processes as disclosed produce a relatively low density product. In general the density of the product produced by these processes is controlled by changing the amount and/or kind of foaming agent. In some cases, it is advantageous to use a constant formulation and produce a denser product. Particularly, it is advantageous in dishwashing detergents for use in automatic dishwashers which have a fixed volume dispenser. An improvement to the processes that are disclosed in the foregoing Belgian patent that enable denser products to be produced independent of the foaming agent is a significant advance in the art.

It is, therefore, an object of this invention to provide an improved process for producing detergents containing alkali metal tripolyphosphate.

It is an additional object of this invention to provide an improved detergent product containing alkali metal tripolyphosphate.

Other objects of this invention will become readily apparent to one skilled in the art from the following detailed description.

In accordance with this invention, an alkali metal trimetaphosphate is reacted with a strong base in the presence of a foaming agent to produce a particular product containing alkali tripolyphosphate and at least a portion of the reaction is conducted in the presence of relatively minor amounts of volatile organic compounds which have boiling points below the temperature of the reaction medium, that is, generally below 135° C. and which compounds are soluble in aqueous solution having a pH above about 10. The resulting process enables the density of the product to be increased independent of the foaming agent employed and independent of the formulation used. It is believed surprising that these volatile compounds would be at all useful in increasing the density of the products because these compounds widen the temperature range of the evolution of vapors and thereby would normally be expected to cause increased foaming thus decreasing the density of the product.

Although it is not known with certainty exactly why certain volatile organic compounds function to increase the density of the resulting product wherein a portion of the conversion of alkali metal trimetaphosphate to alkali metal tripolyphosphate is carried out in the presence of these volatile compounds. It is believed that the evolution of volatile materials (water and volatile organic compounds) from the slurry over a wider temperature range (and generally over a longer period of time) along with a modification of the reaction rate of the strong base and alkali metal trimetaphosphate result in the increased product density. It is believed, therefore, that a combination of various physical properties of the useful compounds result in the improvement of this invention. Therefore, to achieve the advantage of this invention one employs organic compounds which are soluble in the aqueous slurry and have a boiling point below the maximum temperature of the reaction medium and which will evolve from the slurry under reaction conditions.

In general the compounds which have been found useful in the practice of this invention are water soluble oxygen-containing organic compounds which have boiling points below about 135° C. by a "water soluble oxygen-containing organic compound" as used herein it is meant that at least 5 grams of the compounds will dissolve in 100 grams of water at 20° C. with the pH adjusted to about 10 with sodium hydroxide. The particular compound selected will depend upon the maximum reaction temperature used in the practice of this invention. As is disclosed in Belgian Patent No. 633,146, the maximum temperature generally employed is about 135° C. In most instances, however, it is advantageous to use a lower reaction temperature such as 115° C. or even lower. In such instances, there would be employed an organic oxygen-containing compound which has a boiling point below 115° C. or even lower. It is generally preferred to use compounds which have a boiling point below about 100° C. since temperature control in some of the processes tend to be difficult and if compounds having a boiling point below 100° C. are employed the benefits of this invention will be achieved in all cases. However, as used herein, a "volatile compound" means one which boils below maximum temperature of the reaction medium and will evolve from the aqueous medium under reaction conditions.

The compounds which have been found to be useful in the practice of this invention are the lower aliphatic monohydric alcohols and lower aliphatic ketones which have the foregoing properties of water solubility and volatility. Nonlimiting examples of the water soluble volatile oxygen-containing organic compounds useful in the practice of this invention include methyl alcohol, ethyl alcohol, n-propyl alcohol, isopropyl alcohol, sec-butyl alcohol, tert-butyl alcohol, acetone, methyl ethyl ketone, methyl isopropyl ketone, vinyl methyl ketone, 2-methyl-1-chloro-3-pentanone, 4-methyl-2-octanone, 1-heptene-5-one, 3-dodecanone, 1-ethoxy-2-propanone, and mixtures thereof.

As mentioned previously, although compounds having a boiling point above 100° C. can be used, it is generally preferred in the practice of this invention to use those compounds which have a boiling point below 100° C.

Therefore, it is preferred in the practice of this invention to use the lower aliphatic monohydric alcohols and lower aliphatic ketones, that is, the lower alkyl monohydric alcohols which contain from 1 to 4 carbon atoms such as methyl alcohol, ethyl alcohol, n-propyl alcohol and the like and lower alkyl ketones containing from 1 to 4 carbon atoms such as acetone, methyl ethyl ketone, methyl isopropyl ketone and the like.

Although the advantages of this invention can be achieved with as little as .025% by weight based upon the weight of the product produced by the process of the water soluble volatile oxygen-containing compounds, it is generally preferred to incorporate at least about 0.5% by weight to obtain a significant increased density and it is further preferred to incorporate amounts from about 1% to about 8% by weight. However amounts greater than 8% by weight, such as 10% or even 20%, can be used. Amounts greater than about 8 weight percent do not produce any additional beneficial results and needlessly add to the cost of the product, therefore are not usually used.

There can be employed in accordance with this invention any of the foaming agents, alkali metal trimetaphosphate, and additives disclosed as being suitable in the above-mentioned Belgian Patent No. 633,146. The process conditions employed in the practice of this invention are generally the same as disclosed in Belgian Patent 633,146. However in some instances, it may be advantageous to employ as little as about 0.01% by weight of the foaming agent.

The preferred foaming agents in the practice of this invention are the water soluble soaps, water soluble alkyl aryl sulfonates, water soluble alkyl sulfates, which are well known anionic detergent actives. Examples of non-ionic active foaming agents which are preferred are the alkali metal salts of sulfated ethylene oxide or propylene oxide condensation products manufactured by ethoxylating propylene and subsequently sulfating various organic hydrophobic compounds containing active hydrogen such as alcohols, mercaptans, phenols, and amines; sodium and potassium alkyl glyceryl ethers; alcohol-alkylene oxide condensates; and alkylphenol-alkylene oxide condensates. Of these, those in the anionic class are preferred, while the fatty alkylol sulfates, alkyl aryl sulfonates and fatty acid soaps having from 8 to 20 carbon atoms in their carbon chains are further preferred in the process of this invention.

Any suitable manipulative procedure resulting in the portion of the reaction of the alkali metal trimetaphosphate with a strong base being conducted in the presence of a foaming agent and a water soluble volatile oxygen-containing compound of the class herein described can be employed in accordance with this invention. One relatively easy method of practicing this invention is to add the volatile material to an aqueous slurry of the alkali metal trimetaphosphate prior to the addition of strong base and foaming agent. However, since the reaction rate of trimetaphosphate with a strong base is relatively slow at room temperature, it is possible to form an aqueous slurry of the alkali metal trimetaphosphate, foaming agent, strong base, and the volatile material in water at relatively low temperature, that is, below 30° C., and heat the slurry to complete the conversion of alkali metal trimetaphosphate to alkali metal tripolyphosphate. Also, if it is desired, the material other than the alkali metal trimetaphosphate slurry can be slurried together, heated to about 40° C. and alkali metal trimetaphosphate added thereto.

In general the products which tend to be too light in density without the benefits of this invention are those which contain at least 50% by weight of the alkali metal tripolyphosphate; therefore this invention will normally be used on such processes. However in certain instances, some benefits can be derived when the product contains less than 50% by weight of the alkali metal tripolyphosphates. Additionally sodium tripolyphosphate is the most commonly used of the alkali metal tripolyphosphates; the process improvement of this subject invention will generally be employed in the production of products containing sodium tripolyphosphate. However this improvement applies equally well to all processes for producing other alkali metal tripolyphosphates such as potassium and lithium wherein an alkali metal trimetaphosphate is reacted with a strong base in the presence of a foaming agent to thereby form a product containing alkali metal tripolyphosphate.

To more fully illustrate the subject invention, the following nonlimiting examples are presented. Unless otherwise specified, all parts, proportions, and percentages are by weight.

EXAMPLE I

Two products containing the following ingredients are made in the manner described below.

TABLE I

| Ingredient | Parts by weight | |
|---|---|---|
| | Product A | Product B |
| Sodium dodecylbenzene sulfonate | 10.7 | 10.7 |
| Sodium lauryl sulfate | 18.2 | 18.2 |
| Lauryl amide | 2.0 | 2.0 |
| Sodium toluene sulfate | 1.5 | 1.5 |
| Sodium silicate | 15.9 | 15.9 |
| Sodium sulfate | 14.0 | 14.0 |
| Carboxymethylcellulose | 0.8 | 0.8 |
| Sodium hydroxide | 20.8 | 20.8 |
| Water | 20.0 | ¹ 20.0 |
| Sodium trimetaphosphate | 39.9 | 39.9 |
| Density (g./cc.) | 0.34 | 0.59 |

¹ Ethyl alcohol.

All materials except sodium hydroxide are slurried and heated to about 65°–75° C. The sodium hydroxide is added with vigorous agitation and the material is allowed to foam and the steam to evolve. After the evolution of steam ceases, a porous solid mass is formed. The material is cooled for 24 hours, mechanically broken up, and screened. The bulk density of the material which passes through a U.S. Standard 20 mesh screen but is retained on a U.S. Standard 100 mesh screen is given in Table I. Thus, contrary to expectations that a material having a lower boiling point than water would cause a less dense product, suprisingly the addition of the ethyl alcohol lowers the volume extension and hence produces a more dense product.

Although the actual density increase achieved by the addition of the organic oxygen containing materials will vary depending upon the particular system and ingredients used, it is found that the density increase is generally directly related to the amounts used within the ranges specified and that the density of product can be controlled within the bulk density range of from about 0.35 to about 0.90 gram per cc.

Substantially similar results in increased density are achieved by substituting similar amounts of other water-soluble oxygen-containing organic compounds for ethyl alcohol in the foregoing process. For example, similar amounts of acetone, methyl alcohol, n-propyl alcohol, methyl ethyl ketone, and isopropyl alcohol can be substituted for ethyl alcohol in the foregoing process and the product produced has a significantly increased density when compared to the product produced without the additition of the foregoing volatile compounds.

EXAMPLE II

Into a mixing vessel which is fitted with a conventional paddle stirrer and jacketed so that either hot or cold water or steam can be used in the jacket are charged 4,000 parts of water, 1,800 parts of sodium dodecylbenzene sulfonate, 1,200 parts of sodium dodecyl sulfate, 2,000 parts of sodium sulfate, 5,200 parts of sodium trimetaphosphate, 60 parts of sodium carboxymethyl cellulose and 150 parts of acetone. The resulting slurry is stirred for about 20 minutes to insure thorough mixing and the temperature is raised to about 60° C. by circulating steam through the jacket.

After the temperature reaches about 60° C. about 2,720 parts of a 50% aqueous sodium hydroxide solution are added. After about 30 seconds, the temperature of the slurry begins to rise and the slurry begins to expand. The agitation is discontinued when the temperature reaches about 90° C. Vapors of acetone and steam evolve from the mass and within about 15 minutes the reaction mass begins to solidify. After being air dried overnight to remove most of the excess free water, the detergent product has a bulk density of about 0.7 gram per cc.

Using essentially the same process and components as described above, a detergent composition is prepared but without acetone. The bulk density of this material is about 0.35 gram per cc.

Substantially similar results in increased density are achieved by substituting similar amounts of other water soluble oxygen-containing organic compounds for acetone in the foregoing process. For example, similar amounts of ethyl alcohol, methyl alcohol, tert-butyl alcohol, methyl ethyl ketone and methyl isopropyl ketone can be substituted for acetone in the foregoing process and the product produced has significantly increased density when compared to the product produced without the addition of the foregoing volatile compounds.

EXAMPLE III

An improved sodium tripolyphosphate product is produced in the following manner. About 368 parts of sodium trimetaphosphate are slurried in about 224 parts of water in an agitated vessel to form a slurry containing about 62% solids. About 4 parts of soap flakes from a tallow base amounting to about 0.7% of the finished product are added and the mixture is heated to about 40° C. and about 6 parts of isopropyl alcohol and about 6 parts of methyl ethyl ketone are added. Following the addition of the alcohols, about 192 parts of 50% sodium hydroxide are added. The temperature of the reaction mixture increases to above about 100° C. and the agitation is shut off at the time of the first evolution of vapor. The reaction is completed within about 10 mintues and the porous mass formed by the evolution of vapor begins to cool. After the material is cooled to room temperature, it is removed from the vessel and air dried, and has a bulk density of about 0.9 compared with a bulk density of about 0.4 of a material produced by the same process but without the use of a volatile alcohol.

Substantially similar results are achieved by using the same procedure when alcohols, such as ethyl alcohol, methyl alcohol, sec-butyl alcohol, and n-propyl alcohol, are substituted in equivalent weight amounts for the isopropyl alcohol of the above example and by substituting in equivalent weight amounts other ketones, such as acetone, methyl isopropyl ketone, and vinyl methyl ketone, for the methyl ethyl ketone in the above example.

What is claimed is:

1. In a process wherein trimetaphosphate is reacted with a strong base in the presence of a foaming agent to thereby produce a particulate product containing alkali metal tripolyphosphate, the improvement which comprises incorporating into the reaction medium a water soluble volatile oxygen-containing organic compound selected from the group consisting of lower alkanols, lower alkyl ketones and mixtures thereof which have a boiling point below about 135° C.

2. In a process wherein trimetaphosphate is reacted with a strong base in the presence of a foaming agent to thereby produce a particulate product containing alkali metal tripolyphosphate, the improvement which comprises incorporating into the reaction medium a water soluble volatile oxygen-containing organic compound selected from the group consisting of lower alkanols, lower alkyl ketones and mixtures thereof which have a boiling point below about 100° C.

3. An improved process according to claim 2 wherein said volatile compound is a lower alkanol and is present in amounts of at least about 0.5% by weight based upon the weight of the product calculated to be produced by said process.

4. An improved process according to claim 2 wherein said volatile compound is a lower alkyl ketone and is present in amounts of at least about 0.5% by weight based upon the weight of the alkali metal trimetaphosphate.

5. An improved process according to claim 3 wherein said volatile alcohol is methyl alcohol.

6. An improved process according to claim 3 wherein said volatile alcohol is ethyl alcohol.

7. An improved process according to claim 4 wherein said ketone is acetone.

References Cited

UNITED STATES PATENTS 3,337,468   8/1967   Metcalf et al. _____ 252—139

LEON D. ROSDOL, *Primary Examiner.*

B. BETTIS, *Assistant Examiner.*

U.S. Cl. X.R.

252—137, 138; 23—106